(12) United States Patent
Nakayama

(10) Patent No.: US 7,678,016 B2
(45) Date of Patent: Mar. 16, 2010

(54) CONTROL APPARATUS FOR VEHICLE

(75) Inventor: Jun Nakayama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 461 days.

(21) Appl. No.: 11/700,815

(22) Filed: Feb. 1, 2007

(65) Prior Publication Data
US 2007/0184936 A1    Aug. 9, 2007

(51) Int. Cl.
F16H 61/00 (2006.01)
B60W 10/02 (2006.01)
G06F 7/00 (2006.01)

(52) U.S. Cl. .................. 477/45; 192/3.63; 701/60

(58) Field of Classification Search .............. 477/44, 477/45, 70, 79, 86, 174, 180; 701/58, 60; 192/3.63, 3.54, 3.55, 3.57
See application file for complete search history.

(56) References Cited

U.S. PATENT DOCUMENTS

| 4,606,446 | A  | * | 8/1986  | Watanabe ............... 477/39 |
| 6,406,402 | B1 | * | 6/2002  | Eguchi et al. ............ 477/45 |
| 6,733,299 | B2 |   | 5/2004  | Eguchi et al. |
| 6,945,906 | B2 | * | 9/2005  | Eguchi et al. ............ 477/45 |
| 6,974,009 | B2 |   | 12/2005 | Hoshiya et al. |

FOREIGN PATENT DOCUMENTS

| EP | 0421202 A2 * | 4/1991 |
| JP | 10-002390    | 1/1998 |
| JP | 2000-193081  | 7/2000 |
| JP | 2003-120721  | 4/2003 |
| JP | 2003-227562  | 8/2003 |
| JP | 2004-245290  | 9/2004 |

* cited by examiner

Primary Examiner—Roger Pang
(74) Attorney, Agent, or Firm—Smith, Gambrell & Russell, LLP

(57) ABSTRACT

A vehicle having, in a power transmission path, a continuously variable transmission mechanism and a clutch mechanism, whose torque capacity is smaller than that of the continuously variable transmission mechanism. The vehicle also has a control system to prevent a large torque capacity difference with the continuously variable transmission mechanism and clutch mechanism and to prevent an unnecessary slip of the clutch mechanism by setting an engagement force of the clutch mechanism based on the torque capacity of the continuously variable transmission mechanism. There is also avoided a decline of the learning accuracy of the clutch mechanism by prohibiting a learning control of the clutch mechanism when an engagement force of the clutch mechanism is set based on the torque capacity of the continuously variable transmission mechanism.

20 Claims, 5 Drawing Sheets

FIG. 5
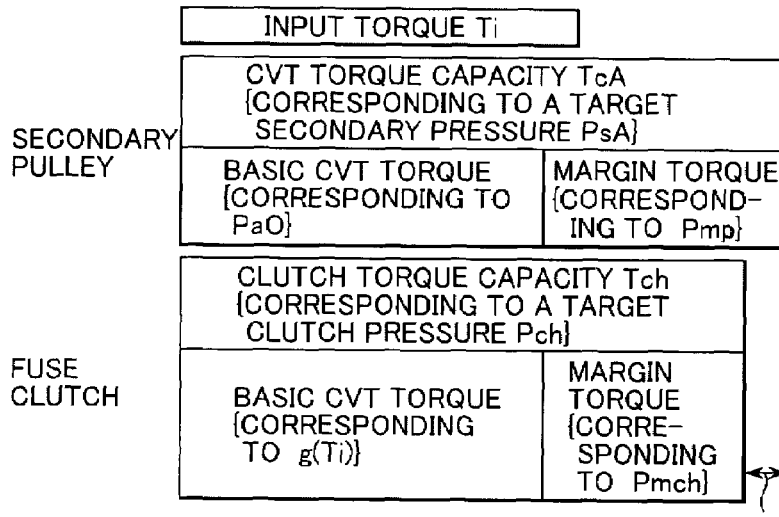
(A) NORMAL CONTROL
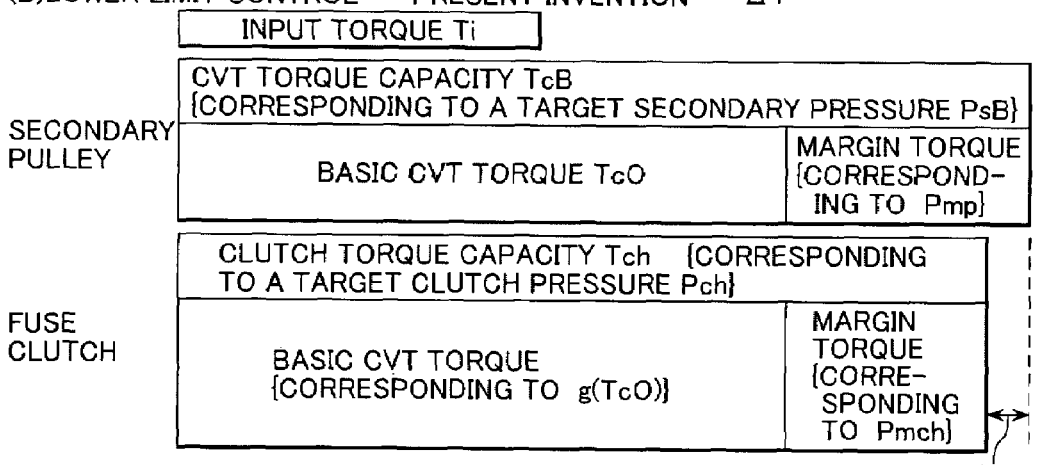
(B) LOWER LIMIT CONTROL ··· PRESENT INVENTION
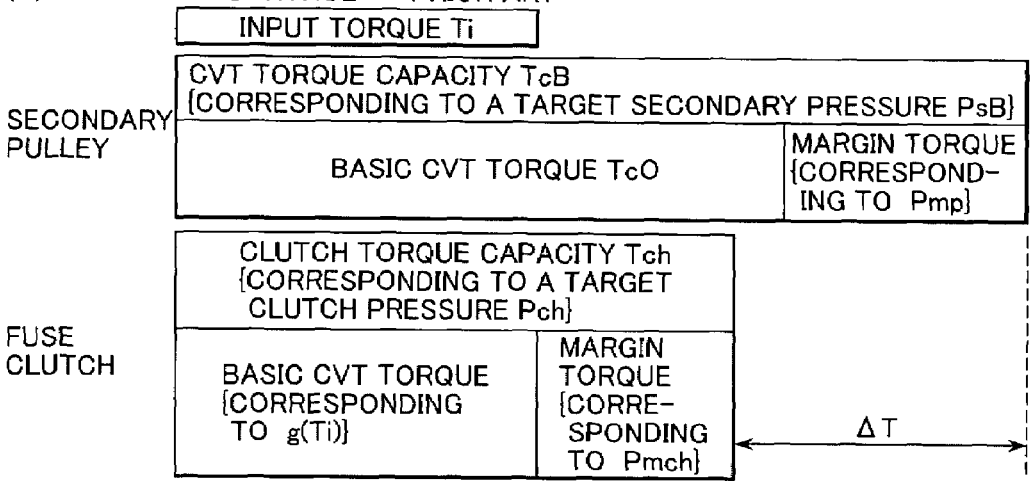
(C) LOWER LIMIT CONTROL ··· PRIOR ART

CONTROL APPARATUS FOR VEHICLE

BACKGROUND OF THE INVENTION

1. Field of the Invention

The present invention relates to a control apparatus for a vehicle having a continuously variable transmission mechanism and a clutch mechanism in a power transmission path.

2. Description of the Related Art

In a continuously variable transmission (CVT) equipped in a power transmission path of a vehicle, there are a belt-type continuously variable transmission, a toroidal-type continuously variable transmission and so on. A continuously variable transmission mechanism incorporated in the belt-type continuously variable transmission has a primary pulley attached to an input shaft, a secondary pulley attached to an output shaft, and a drive belt wound around these pulleys. It controls a speed ratio continuously by changing a diameter of a loop of the drive belt. A continuously variable transmission mechanism incorporated in the toroidal-type continuously variable transmission has input discs attached to an input shaft, output discs attached to an output shaft and power rollers sandwiched between input discs and output discs. It controls a speed ratio continuously by changing a contact radius of the power rollers against each disc.

A torque capacity of the belt-type continuously variable transmission is determined based on a friction force between the pulleys and the drive belt, which is set depending on a magnitude of a hydraulic pressure supplied to hydraulic chambers of the pulleys. A torque capacity of the toroidal-type continuously variable transmission is determined based on a shearing force of a traction oil between the discs and the power rollers, which is set depending on a magnitude of a thrust power for thrusting the discs in a axial direction. When a torque inputted to the continuously variable transmission mechanism is larger than the friction force or the shearing force, a slip of the drive belt or the power rollers occurs.

In order to prevent the slip of the drive belt, etc., and to avoid damage of the continuously variable transmission mechanism, it is needed to increase the friction force of the drive belt or the shearing force of the traction oil. However the increase of the friction force, etc., causes an increase in internal resistance of the continuously variable transmission mechanism, which becomes a factor of a decline of power transmission efficiency. Moreover, raising the operating hydraulic pressure to increase the friction force etc causes an increase of power loss occurring in an oil pump, which might lower fuel economy. In an effort to solve these problems, it is desirable to set the torque capacity of the continuously variable transmission mechanism low within the range that a slip of the driving belt and the power rollers does not occur.

Japanese Unexamined Patent Application Publication No. 2003-227562 (Prior Art 1) and Japanese Unexamined Patent Application Publication No. 2004-245290 (Prior Art 2) describe a continuously variable transmission having a clutch mechanism which a torque capacity is smaller than that of a continuously variable transmission mechanism and making the clutch mechanism slip earlier than the continuously variable transmission mechanism when an excess torque develops in the power transmission path. There is described reducing the torque capacity of the continuously variable transmission mechanism until a slip occurs while protecting the continuously variable transmission mechanism by providing the clutch mechanism and detecting a slip of the clutch mechanism. There is further described a device to achieve a high-precision clutch control of the clutch mechanism by monitoring the relationship between a clutch pressure supplied to the clutch mechanism and a clutch capacity of the clutch mechanism obtained thereby.

The continuously variable transmissions described in the Prior Art 1 and the Prior Art 2 calculate and learn a clutch pressure of the clutch mechanism based on an input torque to the continuously variable transmission mechanism and based on the supposition that the continuously variable transmission is operating steady state or a state free from a large torque deviation. If a torque capacity of the clutch mechanism is set based on the input torque to the continuously variable transmission mechanism when the torque capacity of the continuously variable transmission mechanism is controlled based on a predetermined lower limit hydraulic pressure such as a vehicle braking condition, it is difficult to operate the clutch mechanism as a fuse clutch effectively, i.e. the clutch to disconnect the transmission of the torque by slippage in the case where the excess input torque is applied. On vehicle braking, a difference of the torque capacity of the continuously variable transmission mechanism and that of the clutch mechanism might become large, because the torque capacity of the continuously variable transmission mechanism is increased in order to adapt the braking torque. In such a situation, there might be an unnecessary slip of the clutch mechanism, even if the torque capacity of the continuously variable transmission mechanism has a margin that attempts to accommodate the braking torque. Performing a learn control of the clutch mechanism which the vehicle is a braking state causes a decline in a learning accuracy and a decline of the control accuracy of the clutch mechanism, because it is difficult to estimate the braking torque inputted from the drive wheels.

An embodiment of the present invention is described of avoiding an unnecessary slip of the clutch mechanism for protecting a continuously variable transmission mechanism and avoiding a decline of the learning accuracy of the clutch mechanism.

SUMMARY OF THE INVENTION

The subject matter of the present invention includes providing a control apparatus for a vehicle equipped with a continuously variable transmission mechanism and a clutch mechanism in a power transmission path for transmitting a power from a power source to driving wheels or the like. An embodiment of the invention features an engagement force controller for setting a clutch engagement force of said clutch mechanism based on a torque capacity of said continuously variable transmission mechanism; a learning controller for learning control to learn a relationship between the clutch engagement force and a clutch torque capacity of said clutch mechanism; a first torque capacity setting device for setting a first torque capacity of said continuously variable transmission mechanism based on an input torque from said power source; a second torque capacity setting device for setting a second torque capacity of said continuously variable transmission mechanism based on a vehicle condition, wherein said learning controller prohibits the learning control of the clutch engagement force in the case where said second torque capacity is larger than said first torque capacity.

DESCRIPTION OF THE DRAWINGS

FIGS. 5(A), 5(B) and 5(C) are explanatory diagrams showing a torque capacity of a continuously variable transmission mechanism and that of a fuse clutch.

DETAILED DESCRIPTION

Preferred embodiments of the present invention will hereinafter be described in detail with reference to the attached drawings.

Figure 1:
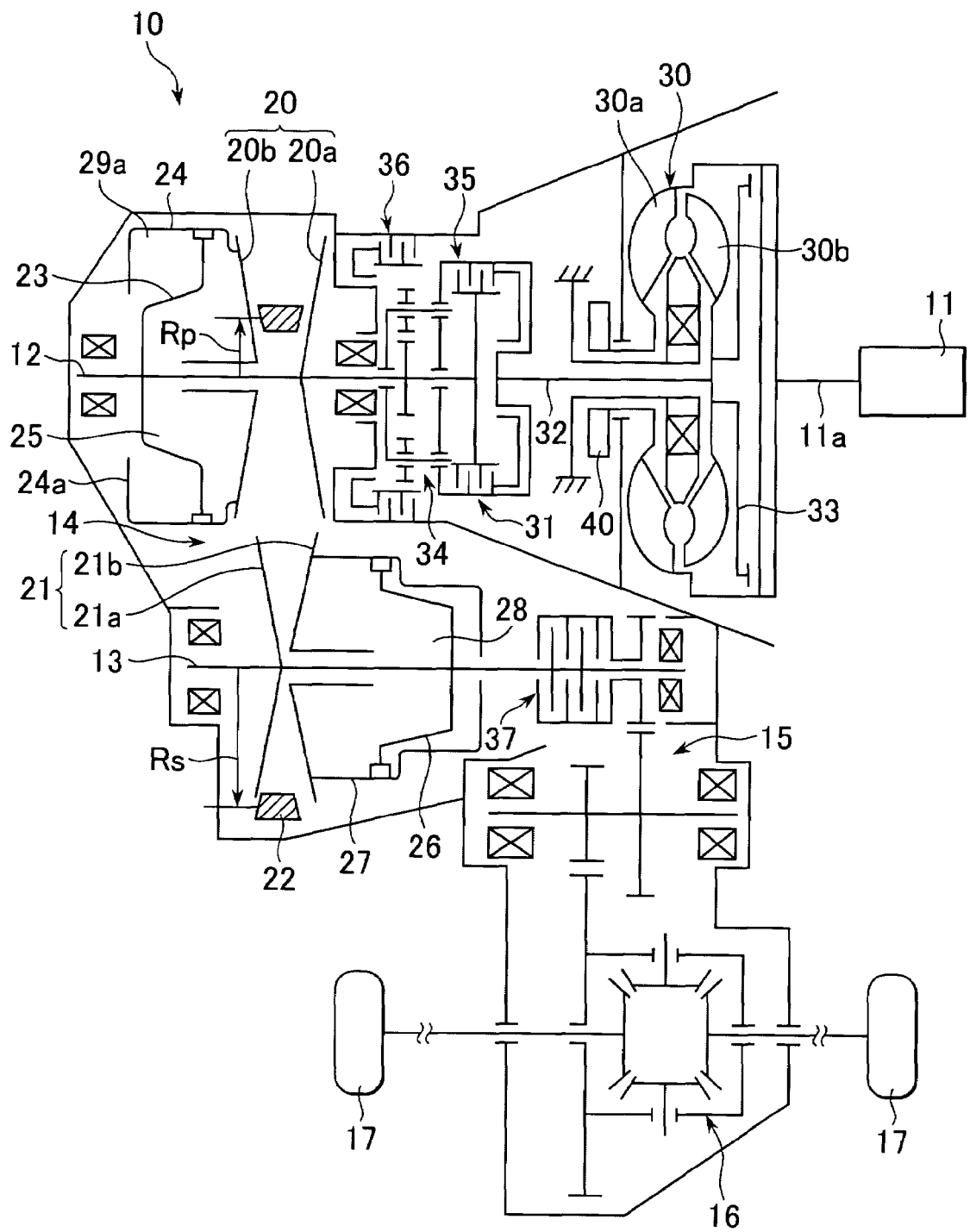
FIG. 1 is a schematic diagram showing a continuously variable transmission controlled by one embodiment of the present invention.

FIG. 1 is a schematic illustration of a continuously variable transmission 10 controlled by a vehicle control unit which is one embodiment of the present invention. As shown in FIG. 1, the continuously variable transmission 10 is a belt type continuously variable transmission including: a primary shaft 12 driven by a engine 11 as a drive power source; and a secondary shaft 13 in parallel with the primary shaft 12. A continuously variable transmission mechanism 14 is provided between the primary shaft 12 and the secondary shaft 13. A rotation of the primary shaft 12 is transmitted to the secondary shaft 13 through the continuously variable transmission mechanism 14 which changes the rotation continuously. A rotation of the secondary shaft 13 is transmitted to left and right driving wheels through a reduction gear set 15 and a differential 16.

A primary pulley (driving pulley) 20 is provided on the primary shaft 12 and has: a stationary sheave 20a, which is incorporated with the primary shaft 12, and a movable sheave 20b which is opposed to the stationary sheave 20a, and is provided on the secondary shaft 13 to be able to slide in the axial direction. A secondary pulley (driven pulley) 21 which provided on secondary shaft 13, has a stationary sheave 21a which is incorporated with the secondary shaft 13. The secondary pulley 21 also includes a movable sheave 21b which is opposed to the stationary sheave 21a and is provided on the secondary shaft 13 to be able to slide in the axial direction. A drive belt 22 is shown wound around the primary pulley 20 and the secondary pulley 21. A diameter of a loop of the drive belt 22 looped around the primary pulley 20 and a diameter of a loop of the drive belt 22 looped around the secondary pulley are varied continuously by changing a width between the primary pulley 20 and the secondary pulley 21. With the diameter of a loop of the drive belt 22 looped around the primary pulley 20 referenced as "Rp" and with the diameter of a loop of the drive belt 22 looped around the secondary pulley 21 is referenced as "Rs", a speed ratio of the continuously variable transmission mechanism is Rs/Rp.

In order to vary a pulley groove width of the primary pulley 20, a plunger 23 is fixed to the primary shaft 12 and a cylinder 24 is fixed to the movable sheave 20b to slidably contact the outer periphery of the plunger 23. A primary hydraulic chamber 25 is formed by the plunger 23 and the cylinder 24. In order to vary a pulley groove width of the secondary pulley 21, a plunger 26 is fixed to the secondary shaft 13 and a cylinder 27 is fixed to the movable sheave 21b to slidably contact the outer periphery of the plunger 26 in the same way. A secondary hydraulic chamber 28 is formed by the plunger 26 and the cylinder 27. Each pulley groove width is controlled by regulating a primary pressure supplied to the primary hydraulic chamber 25 and a secondary pressure supplied to the secondary hydraulic chamber 28.

A torque converter 30, and a forward and reverse changeover apparatus 31 are provided between a crankshaft 11a and the primary shaft 12. The torque converter 30 has a pump shell 30a coupled to the crankshaft 11a, and a turbine runner 30b facing the pump shell 30a and coupled to the turbine shaft 32. Moreover a lock-up clutch 33 is incorporated in the torque converter 30 to couple the crankshaft 11a and the turbine shaft 32 depending on a driving condition. On the other hand, the forward and reverse changeover apparatus 31 has a double-pinion type planetary gear set 34, a forward clutch 35, and a reverse brake 36. The forward and reverse changeover apparatus 31 changes power transmission paths by operating the forward clutch 35 and the reverse brake 36. When both the forward clutch 35 and the reverse brake 36 are released, the turbine shaft 32 and the primary shaft 12 are decoupled, and the forward and reverse changeover apparatus 31 becomes the neutral condition such that it doesn't transmit power to the primary shaft 12. When the forward clutch 35 is engaged on the condition that the reverse brake 36 is released, a rotation of the turbine shaft 32 is transmitted to the primary pulley 20 without change. On the other hand, when the reverse brake 36 is engaged on the condition that the forward clutch 35 is released, a negative rotation of the turbine shaft 32 is transmitted to the primary pulley 20.

Figure 2:
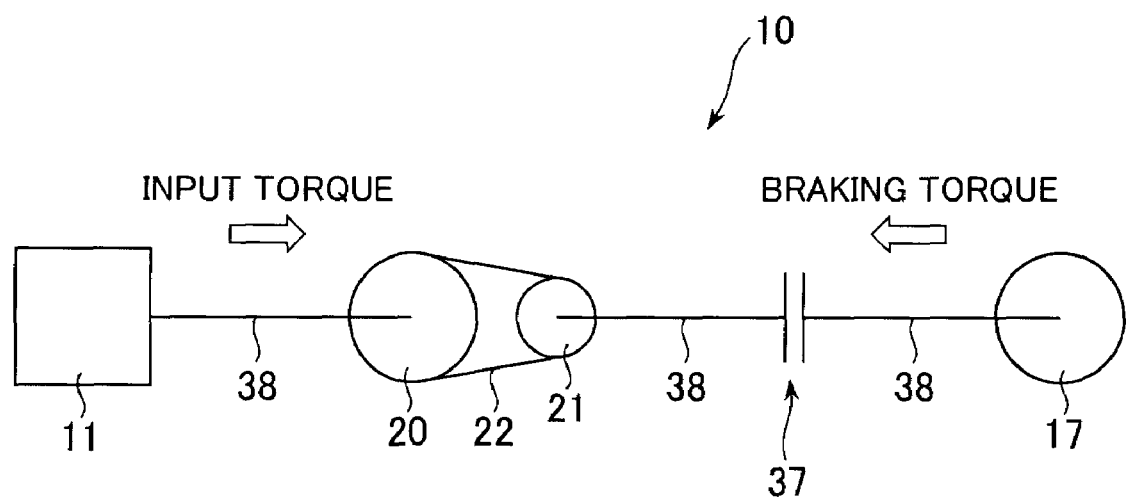
FIG. 2 is an explanatory diagram showing a structure of a continuously variable transmission.

A fuse clutch 37 is coupled to the secondary shaft 13 which outputs power transmitted from the secondary pulley 21. The fuse clutch 37 is a friction clutch to vary its torque capacity depending on the supplied clutch pressure. The fuse clutch 37 is controlled so that the torque capacity of the fuse clutch 37 is slightly smaller than that of a continuously variable transmission mechanism 14. FIG. 2 is an explanatory view to show a structure of the continuously variable transmission 10 schematically. As shown in FIG. 2, it is possible to protect the continuously variable transmission mechanism 14 by letting the fuse clutch 37 slip in advance for limiting transmission of an input torque and by inhibiting a slip of the drive belt 22, even if an excessive input torque or a braking torque are generated relative to the continuously variable transmission 10. The protection is afforded in this embodiment by incorporating the fuse clutch 37 in the power transmission path 38 between the engine 11 and the driving wheels 17 in series with the continuously variable transmission mechanism 14. The rotation of the secondary shaft 13 is transmitted to the left and right driving wheels 17 via the reduction gear set 15 and the differential 16.

Figure 3:
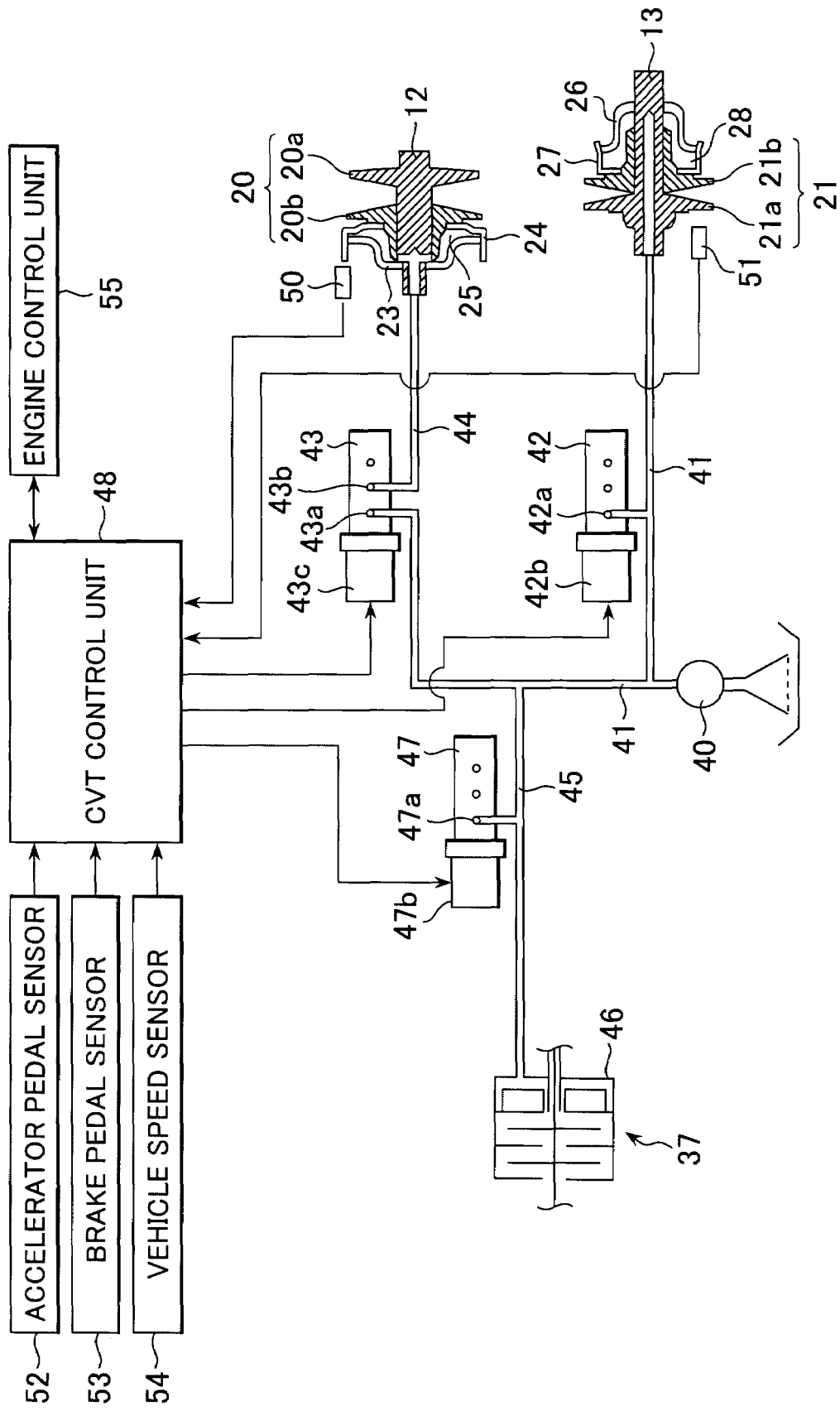
FIG. 3 is a schematic diagram showing a hydraulic control system and an electric control system of the present invention.

FIG. 3 is a schematic view of a hydraulic control system and an electric control system of the continuously variable transmission 10. As shown in FIG. 3, the continuously variable transmission 10 has an oil pump 40 driven by the engine 11, for supplying an operation oil to the primary pulley 20, the secondary pulley 21, the fuse clutch 37 and so on. A secondary pressure line 41, shown connected to a discharge port of the oil pump 40, connects a secondary hydraulic chamber 28 of the secondary pulley 21 and a pressure regulator port 42a of the secondary pressure regulator valve 42. A line pressure (that is secondary pressure) is regulated to avoid slippage of the drive belt 22 by the secondary pressure regulator valve 42, and a torque capacity of the continuously variable transmission mechanism 14 is set depending on the magnitude of the secondary pressure.

A secondary pressure line 41 connects an input port 43a of the primary pressure regulator valve 43. A primary pressure line 44, extending from an output port 43b of the primary pressure regulator valve 43, connects a primary hydraulic chamber 25 of the primary pulley 20. A groove width of the primary pulley 20 is controlled by regulating the primary pressure via the primary pressure regulator valve 43 depending on a target speed ratio. A clutch pressure line 45 diverging from the secondary pressure line 41 connects to a hydraulic chamber 46 of the fuse clutch 37 and a pressure regulator port 47a of the clutch pressure regulator valve 47. Each of the secondary pressure regulator valve 42, the primary pressure regulator valve 43 and the clutch pressure regulator valve 47 is preferably an electromagnetic pressure regulator valve, which can regulate a secondary pressure, a primary pressure and a clutch pressure by controlling a current supplied to solenoid coils 42b, 43c, 47b from a CVT control unit 48.

The CVT control unit 48 is shown as controlling the speed ratio and the torque capacity of the continuously variable transmission mechanism 14; and the torque capacity of the fuse clutch 37. The CVT control unit 48 preferably has a microprocessor (CPU) not shown in the figures, which connects, for example, a ROM, a RAM and I/O ports through bus lines. The ROM stores control programs and torque maps. The RAM stores data computed by the CPU temporarily. Detection signals showing vehicle conditions derived from various types of sensors via the I/O ports input into the CPU. The CVT control unit 48, with the assistance of the detected signals, functions as engagement force setting means, first torque setting means, second torque setting means, and learning prohibition means.

There is further shown a primary speed sensor 50 to detect rotations of the primary pulley 20, a secondary speed sensor 51 to detect rotations of the secondary pulley 21, an accelerator pedal sensor 52 to detect an operation condition of an accelerator pedal, a brake pedal sensor 53 to detect an operation condition of a brake pedal, and a vehicle speed sensor 54 to detect a vehicle speed, as various sensors to input the detection signals into the CVT control unit 48. The CVT control unit 48 connects an engine control unit 55, the continuously variable transmission 10 and the engine 11 are controlled to work together.

Figure 4:
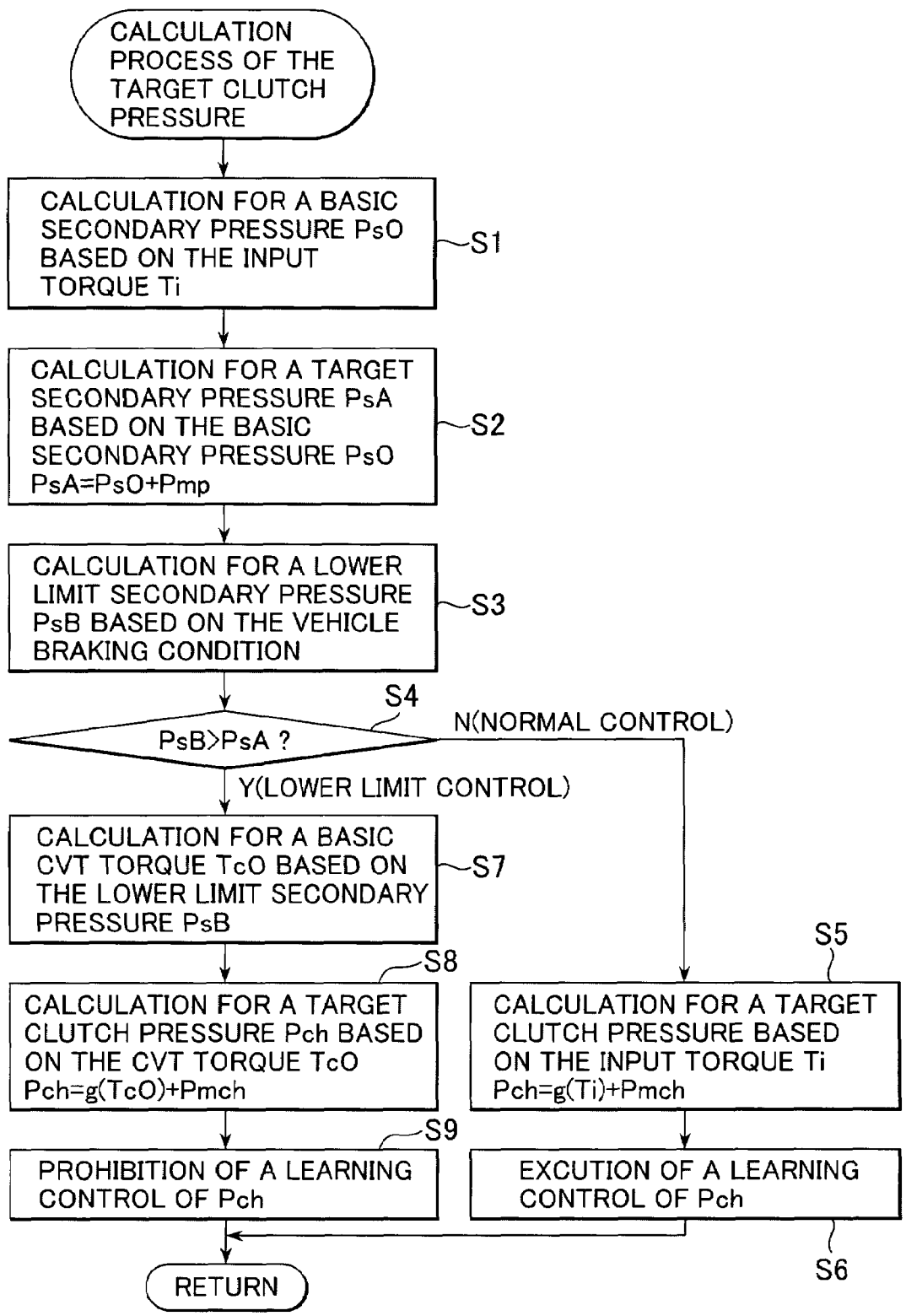
FIG. 4 is a flowchart showing steps for calculating a target clutch pressure.

A description is made of a calculation method of the target clutch pressure performed by the CVT control unit 48. FIG. 4 is a flow chart to show a calculation process of the target clutch pressure supplied to the fuse clutch 37. FIG. 5 is an explanatory drawing to show a torque capacity of the continuously variable transmission mechanism 14 and the fuse clutch 37. FIG. 5(C) shows a torque capacity of fuse clutch 37 controlled by a conventional vehicular control apparatus as a comparative example.

First, as shown in a FIG. 4, a basic secondary pressure PsO necessary to transmit the input torque Ti inputted into the continuously variable transmission mechanism 14 is calculated based on the input torque Ti in a step S1. A target secondary pressure PsA supplying to the secondary pulley 21 is calculated by adding a margin pressure Pmp to the basic secondary pressure PsO in a step S2. A lower limit secondary pressure PsB that should be supplied to the secondary pulley 21 is calculated based on a vehicle braking condition (vehicle condition) in a step S3. As a vehicle braking condition to be set this lower limit secondary pressure PsB, there are braking conditions operated braking torque by pressing a brake pedal down, coast running conditions operated engine brake force by releasing an accelerator pedal, and so on. If the CVT torque capacity is set only based on the input torque Ti in a condition that not only the input torque Ti from the engine 11 but also the braking torque from the drive wheels are operated to the continuously variable transmission mechanism 14, there might be shortage of the CVT torque capacity. The CVT torque capacity is set based on the lower limit secondary pressure in consideration of the braking torque.

A magnitude of the target secondary pressure PsA is compared with that of the lower limit secondary pressure PsB in a step S4. If the target secondary pressure PsA is larger than the lower limit secondary pressure PsB; in other words a normal control condition that the target secondary pressure PsA is supplied to the secondary pulley 21, the process moves to a step S5. In the step S5, a basic clutch pressure g(Ti) necessary to transmit the input torque Ti is calculated based on the input torque Ti, and the target clutch pressure Pch of the fuse clutch 37 is calculated by adding the basic clutch pressure g(Ti) to a margin pressure Pmch.

In a step S6, a learning control of the target clutch pressure Pch is performed. This learning control is a control to learn a relation between the target clutch pressure Pch supplied to the fuse clutch 37 and a clutch torque capacity obtained by this target clutch pressure Pch. It is possible to achieve a high-precision clutch control in consideration of a variation of the fuse clutch 37 by performing the learning control. On performing the learning control, the relation between the target clutch pressure Pch and the clutch torque capacity is learned by reducing the target clutch pressure Pch and slipping the fuse clutch 37 intentionally on a predetermined running condition.

On the other hand, if the target secondary pressure PsA is smaller than the lower limit secondary pressure PsB in the step S4; in other words a lower limit control condition that the lower limit secondary pressure PsB is supplied to the secondary pulley 21, the process moves to a step S7. In the step S7, a basic CVT torque TcO of the continuously variable transmission mechanism 14 is calculated by subtracting a margin torque from a CVT torque capacity obtained by the lower limit secondary pressure PsB. In the step S8, a basic clutch pressure g(TcO) necessary to gain a torque capacity corresponding to the basic CVT torque TcO is calculated, and a target clutch pressure of the Pch of the fuse clutch 37 is calculated by adding a margin pressure Pmch to the basic clutch pressure g(TcO). On the lower limit control condition, a learning control of the above described target clutch pressure Pch is prohibited in a step S9 because it is difficult to estimate a magnitude of the braking torque operating the fuse clutch 37.

As shown in the FIG. 5(A), on the normal control condition that the target secondary pressure PsA is larger than the lower limit secondary pressure PsB, the target clutch pressure Pch is set based on the input torque Ti, because the target secondary pressure PsA based on the input torque Ti is supplied to the secondary pulley. Both the target secondary pressure PsA to set the CVT torque capacity (a first torque capacity) TcA and the target clutch pressure Pch to set the clutch torque capacity (a clutch engagement force) Tch are calculated based on the same input torque, so that a difference with the clutch torque capacity Tch and the CVT torque capacity TcA is not so large and it is possible to keep a balance between the clutch torque capacity Tch and the CVT torque capacity TcA. This makes it possible to protect the continuously variable transmission mechanism 14 with certainty by slipping the fuse clutch 37 in advance to avoid an unnecessary slip of the fuse clutch 37. Moreover, it is possible to improve learning accuracy by performing the learning control of the target clutch pressure Pch on the normal control condition.

Meanwhile, as shown in the FIG. 5(B), when the lower limit control condition of the target secondary pressure PsA is smaller than the lower limit secondary pressure PsB, the lower limit secondary pressure PsB based on a vehicle braking condition is supplied to the secondary pulley. After the basic CVT torque TcO is calculated by subtracting a margin torque from the CVT torque capacity (a second torque capacity) TcB obtained by supplying the lower limit secondary pressure PsB, the target clutch pressure Pch is calculated by using this basic CVT torque TcO. The target clutch pressure Pch is calculated based on the lower limit secondary pressure PsB, so that a difference with the clutch torque capacity Tch set by the target clutch pressure Pch and the CVT torque capacity TcB set by the lower limit secondary pressure PsB is not so large, and it is possible to keep a balance between the clutch torque capacity Tch and the CVT torque capacity TcB. It is possible to protect the continuously variable transmission mechanism 14 with certainty by slipping the fuse clutch 37 in advance and to avoid an unnecessary slip of the fuse clutch 37. Moreover, it is possible to avoid a decline of the learning accuracy by prohibiting the learning control of the target clutch pressure Pch on the lower limit control condition.

On the other hand, as shown in the FIG. 5(C), the conventional vehicular control apparatus calculates the target clutch pressure Pch based on the input torque Ti in the same way as the normal control. There might be a big torque difference ΔT between the CVT torque capacity TcB and the clutch torque capacity Tch, because the CVT torque capacity is set based on the lower limit secondary pressure PsB and the clutch torque capacity Tch is set based on the input torque Ti. When there is a big torque difference between the CVT torque capacity TcB and the clutch torque capacity Tch as above, it is difficult to operate the fuse clutch 37 effectively as a torque limiter to protect the continuously variable transmission mechanism 14, because the fuse clutch 37 slips even if the CVT torque capacity TcB has a margin to bear. Moreover, there can exist a decline of the learning accuracy by performing the learning control of the target clutch pressure Pch on the lower limit control condition, because it is difficult to estimate a magnitude of the braking torque operating to the fuse clutch 37 on the lower limit control condition.

As described above, it is possible to keep the torque difference ΔT between CVT torque capacity TcB and the clutch torque capacity Tch within the predetermined range, and to avoid an unnecessary slip of the fuse clutch 37, because the target clutch pressure Pch is calculated based on basic CVT torque TcO obtained from the lower limit secondary pressure PsB on the lower limit control condition. It is also possible to improve the learning accuracy of the target clutch pressure Pch and perform a torque control of the fuse clutch 37 with high accuracy, because the learning control is prohibited on the lower limit control condition wherein it is difficult to estimate a torque operating to the fuse clutch 37.

The present invention is not limited to the above embodiments, and can be variously modified and altered without departing from the gist thereof. For example, in the illustrated embodiments, the continuously variable transmission mechanism 14 has been constituted by a belt-type continuously variable transmission mechanism having a primary pulley 20, a secondary pulley 21, and a driving belt 22, but may be constituted by a toroidal-type continuously variable transmission mechanism having power rollers sandwiched between input discs and output discs, as well as other means for achieving a continuously variable transmission mechanism in a transmission path.

In the case shown in the flowchart of FIG. 4, the CVT torque capacity TcA (the first torque capacity) is compared with the CVT torque capacity TcB (the second torque capacity) by comparing the target secondary pressure PsA with the lower limit pressure PsB in the step S4, but it might be compared in other ways as in a comparison of a CVT torque capacity TcA with a CVT torque capacity TcB after calculating the CVT torque capacity TcA based on the target secondary pressure PsA and calculating the CVT torque capacity TcB based on the lower limit secondary pressure PsB.

In the embodiment of the invention described above, the CVT torque capacity TcA,TcB of the continuously variable transmission mechanism 14 is set by the secondary pressure supplied to the secondary pulley 21, but the CVT torque capacity TcA, TcB of the continuously variable transmission mechanism 14 can also be set by an alternate setting means as is, for example, a setting means that utilize the primary pressure supplied to the primary pulley 20.

In case as shown in FIG. 5, it is shown that the margin torque has a constant magnitude, but the margin torque can be changed depending on the magnitude of the CVT torque capacity TcA, TcB or the clutch torque capacity Tch.

Moreover, in the above-mentioned description, the braking condition or coast running condition are explained as a example of a running condition to set the lower limit secondary pressure PsB, but the clutch torque capacity Tch can be set based on the CVT torque capacity TcB on a selecting control condition that the secondary pressure is raised by a select lever operation to supply an operation oil to the forward clutch 35 and the reverse brake 36.

In an alternate embodiment of the invention an electric motor is attached to the continuously variable transmission 10 as a drive source instead of the engine 10 (e.g. reference 10 can represent a combustion engine, an electric motor or a alternate drive source or any combination of these drive source). In an alternate embodiment, the fuse clutch 37 is provided between the engine 10 and the continuously variable transmission mechanism 14 instead of between the continuously variable transmission mechanism 14 and driving wheels 17.

The entire disclosure of a Japanese Patent Application No. 2006-027846, filed on Feb. 6, 2006 including specification, claims, drawings, and abstract, on which the Convention priority of the present application is based, is incorporated herein by reference in its entirety.

What is claimed is:

1. A control apparatus for a vehicle equipped with a continuously variable transmission mechanism and a clutch mechanism in a power transmission path for transmitting a power from a power source, comprising:
    an engagement force controller for setting a clutch engagement force of said clutch mechanism based on a torque capacity of said continuously variable transmission mechanism;
    a learning controller for learning control of said clutch engagement force;
    a first torque capacity setting device for setting a first torque capacity of said continuously variable transmission mechanism based on an input torque from said power source; and
    a second torque capacity setting device for setting a second torque capacity of said continuously variable transmission mechanism based on a vehicle condition,
    wherein said learning controller prohibits the learning control of the clutch engagement force in the case where said second torque capacity is larger than said first torque capacity.

2. The control apparatus according to claim 1, wherein said engagement force controller sets said clutch engagement force based on said input torque in the case where said second torque capacity is smaller than said first torque capacity.

3. The control apparatus according to claim 1, wherein said engagement force controller sets said clutch engagement force based on said second torque capacity in the case where said second torque capacity is larger than said first torque capacity.

4. The control apparatus according to claim 1, wherein said vehicle condition is a vehicle braking condition.

5. The control apparatus according to claim 4, wherein said vehicle condition is a braking operating condition by operating a brake device.

6. The control apparatus according to claim 4, wherein said vehicle condition is a coast running condition by operating an engine braking force.

7. The control apparatus according to claim 1, wherein said clutch engagement mechanism is provided between said continuously variable transmission mechanism and driving wheels.

8. The control apparatus according to claim 1, wherein said clutch mechanism is provided between said power source and said continuously variable transmission mechanism.

9. The control apparatus according to claim 1, wherein said continuously variable transmission is a belt-type continuously variable transmission.

10. The control apparatus according to claim 1, wherein said continuously variable transmission is a toroidal-type continuously variable transmission having a power roller sandwiched between an input disc and an output disc.

11. The control apparatus according to claim 1, wherein a clutch torque capacity of said clutch mechanism is determined by said clutch engagement force of said clutch mechanism.

12. The control apparatus according to claim 11, wherein said engagement force controller sets said clutch torque capacity smaller than said torque capacity of said continuously variable transmission mechanism.

13. The control apparatus according to claim 1, wherein said learning control of said clutch engagement force learns a relationship between said clutch engagement force and a clutch torque capacity of said clutch mechanism.

14. The control apparatus according to claim 13, wherein said relationship is learned by reducing said clutch engagement force intentionally and detecting a slippage of said clutch mechanism on a predetermined condition.

15. A control apparatus for a vehicle equipped with a continuously variable transmission mechanism and a clutch mechanism in a power transmission path for transmitting a power from a power source, comprising:

engagement force setting means for setting a clutch engagement force of said clutch mechanism based on a torque capacity of said continuously variable transmission mechanism;

learning control means for a learning control of said clutch engagement force;

first torque capacity setting means for setting a first torque capacity of said continuously variable transmission mechanism based on an input torque from said power source; and second torque capacity setting means for setting a second torque capacity of said continuously variable transmission mechanism based on a vehicle condition, wherein said learning control means prohibits the learning control of the clutch engagement force in the case where said second torque capacity is larger than said first torque capacity.

16. The control apparatus according to claim 15, wherein said engagement force setting means sets said clutch engagement force based on said input torque in the case where said first torque capacity is larger than said second torque capacity.

17. The control apparatus according to claim 15, wherein said engagement force setting means sets said clutch engagement force based on said second torque capacity in the case where said second torque capacity is larger than said first torque capacity.

18. The control apparatus according to claim 15, wherein said vehicle condition is a vehicle braking condition.

19. The control apparatus according to claim 18, wherein said vehicle condition is a braking operating condition by operating a brake device.

20. The control apparatus according to claim 18, wherein said vehicle condition is a coast running condition by operating an engine braking force.

* * * * *